US012557784B1

(12) United States Patent
Jin

(10) Patent No.: US 12,557,784 B1
(45) Date of Patent: Feb. 24, 2026

(54) DOUBLE-AIR-DUCT WATER BLOWER FOR PET

(71) Applicant: Ji Er (Zhejiang) Technology Co., LTD., Cixi (CN)

(72) Inventor: Ming Jin, Cixi (CN)

(73) Assignee: Ji Er (Zhejiang) Technology Co., LTD., Cixi (CN)

( * ) Notice: Subject to any disclaimer, the term of this patent is extended or adjusted under 35 U.S.C. 154(b) by 0 days.

(21) Appl. No.: 18/935,545

(22) Filed: Nov. 3, 2024

(51) Int. Cl.
*A01K 13/00* (2006.01)

(52) U.S. Cl.
CPC ................................. *A01K 13/001* (2013.01)

(58) Field of Classification Search
CPC .... A01K 13/00; A01K 13/001; A01K 13/002; A01K 14/00; A45D 20/00; A45D 20/08; A45D 20/10; A45D 20/12; A45D 20/122; A45D 20/38; A45D 44/00; H01B 7/06
See application file for complete search history.

(56) References Cited

U.S. PATENT DOCUMENTS

| | | | | | |
|---|---|---|---|---|---|
| 3,378,065 | A | * | 4/1968 | Mitchell | F26B 21/00 165/122 |
| 5,216,822 | A | * | 6/1993 | Madiedo | F26B 21/003 34/97 |
| 5,555,643 | A | * | 9/1996 | Guasch | F26B 21/001 34/235 |
| 5,926,972 | A | * | 7/1999 | Di Peso | A01K 13/001 34/128 |
| 8,631,767 | B1 | * | 1/2014 | Sack | A01K 13/00 119/606 |
| D792,662 | S | * | 7/2017 | Chen | D30/158 |
| 11,156,229 | B2 | * | 10/2021 | Johnson | F04D 29/584 |
| 2012/0031347 | A1 | * | 2/2012 | Denison | A01K 13/001 119/606 |
| 2014/0261525 | A1 | * | 9/2014 | Ward | A45D 44/00 132/212 |

FOREIGN PATENT DOCUMENTS

| | | | | | |
|---|---|---|---|---|---|
| CN | 204733747 | U | | 11/2015 | |
| CN | 108209119 | A | * | 6/2018 | ........... A45D 20/122 |
| CN | 217089125 | U | | 8/2022 | |
| CN | 218126256 | U | | 12/2022 | |
| CN | 119234724 | A | * | 1/2025 | ............. A01K 13/00 |
| CN | 119453645 | A | * | 2/2025 | ............. A45D 20/12 |
| GB | 2226953 | A | * | 7/1990 | ............. A45D 20/10 |
| WO | WO-2024114632 | A1 | * | 6/2024 | ............... H01B 7/06 |

* cited by examiner

*Primary Examiner* — Ebony E Evans
(74) *Attorney, Agent, or Firm* — Nitin Kaushik

(57) ABSTRACT

The present invention discloses a double-air-duct water blower for a pet, including a water blower main body, where a first air inlet flow channel and a second air inlet flow channel are respectively arranged on two sides of the water blower main body; an air duct partition plate is arranged in the water blower main body; an air outlet flow channel is arranged on the water blower main body; a heating assembly is arranged in the air outlet flow channel; and a fluid enters the water blower main body through the first air inlet flow channel and the second air inlet flow channel, is converged into accumulated air after passing through the air duct partition plate, and then is blown out from the air outlet flow channel after passing through the heating assembly. The structural design of the present invention is reasonable.

10 Claims, 7 Drawing Sheets

DOUBLE-AIR-DUCT WATER BLOWER FOR PET

TECHNICAL FIELD

The present invention relates to the field of pet supplies, and in particular, to a double-air-duct water blower for a pet.

BACKGROUND

A water blower is a specialized electrical tool device used to quickly blow-dry the fur of long-haired pets such as cats and dogs after bathing. Completely different from a traditional human hair dryer, the working principle of the water blower is to generate high-speed and strong wind through a core motor or an electric motor therein and blow the wind to the fur of the pet. Moisture in the fur is dispersed and blown away, so as to achieve the purpose of drying the fur of the pet. The working principle specifically includes: after the pet has been bathed, wiping its body with an absorbent towel, and then blow-drying the pet from top to bottom, and front to back with the water blower.

Some of the existing water blowers are not provided with a heating component to heat the blown-out fluid, which will make pets easy to catch a cold when being blown in cold times. Some water blowers are only provided with one air inlet channel, causing that the air power of the air inlet is insufficient, and the user requirements cannot be met. Although another part of the water blowers is provided with two air inlet channels, no partition plate is arranged there between, causing that the motor at the air inlet position is damaged by two air ducts, and the service life of the water blower is reduced.

SUMMARY

The technical problem to be solved by the invention is to provide a double-air-duct water blower for a pet aiming at the current situation in the prior art.

A technical solution used by the present invention to resolve the above technical problem is:

A double-air-duct water blower for a pet, including a water blower main body, where a first air inlet flow channel and a second air inlet flow channel are respectively arranged on two sides of the water blower main body; an air duct partition plate enabling the flow channel to generate a flow direction change is arranged in a position, close to the first air inlet flow channel or the second air inlet flow channel, in the water blower main body; an air outlet flow channel is arranged on the water blower main body; a heating assembly is arranged in the air outlet flow channel; and a fluid enters the water blower main body through the first air inlet flow channel and the second air inlet flow channel, and is converged into accumulated air after passing through the air duct partition plate, so that air force is increased when the fluid passes through the air outlet flow channel, and then the fluid is blown out from the air outlet flow channel after passing through the heating assembly.

The effects achieved by the above components are that: through the arrangement of the first air inlet flow channel and the second air inlet flow channel, air inlet is performed on the water blower main body, so that the air inlet amount of the water blower main body is increased; through the arrangement of the air duct partition plate, the fluid between the first air inlet flow channel and the second air inlet flow channel is prevented from blowing directly against each other, causing damage to the components inside the water blower's main body, and the fluid can be converged into the accumulated air after passing through the air duct partition plate, so that the air outlet amount is increased; and the heating assembly is arranged and used for heating the fluid, so that the fluid is hot air when passing through the air outlet flow channel.

Preferably, the first air inlet flow channel and the second air inlet flow channel are both provided with an air inlet assembly; and the air inlet assembly includes an electric motor assembly and an outer casing assembly disposed on an outer side of the electric motor assembly.

The effects achieved by the above components are that: the air inlet assembly is arranged and used for performing air inlet work; the electric motor assembly is arranged and used for driving the fluid to enter the water blower main body from the outside of the water blower main body; and the outer casing assembly is arranged and used for isolating substances other than the fluid from entering the water blower main body.

Preferably, the electric motor assembly includes a motor disposed in the water blower main body, a stator disposed on a periphery of the motor, and an air inlet cover arranged on a periphery of the stator; the motor is connected to the air inlet cover through the stator; a magnetic attraction piece is arranged at a front end of the air inlet cover; and the air inlet cover is connected to the water blower main body.

The effects achieved by the above components are that: the motor is arranged and used for performing air suction and transmitting the fluid to the air outlet flow channel; the stator and the air inlet cover are arranged and used for fixedly connecting the motor to the air inlet cover; and the air inlet cover is arranged and used for performing air inlet work.

Preferably, the outer casing assembly includes an air inlet outer cover and a sponge support disposed in the air inlet outer cover; a pre-filter sponge is arranged at a front end of the sponge support, an air cover filter sponge is arranged on a periphery of the sponge support, and an inner cover filter sponge is arranged in the sponge support; a magnet magnetically connected to the magnetic attraction piece is arranged on a central position of the sponge support; and the electric motor assembly and the outer casing assembly are magnetically connected to the magnetic attraction piece through the magnet.

The effects achieved by the above components are that: through the arrangement of the air inlet outer cover, the effect of firstly isolating large-particle substances from entering the water blower main body is achieved; through the arrangement of the sponge support, and the pre-filter sponge, the inner cover filter sponge and the air cover filter sponge arranged on the sponge support, a user can fix the sponge and small-particle substances are filtered into the water blower main body; and the magnet is arranged and used for being magnetically connected to the magnetic attraction piece, so that the user can conveniently detach and replace the outer casing assembly or clean same.

Preferably, the air duct partition plate includes a baffle plate and an air passing portion; the air passing portion is disposed at two sides of the baffle plate by taking the baffle plate as a center; and an extension plate is arranged at a position, facing the motor, of the baffle plate.

The effects achieved by the above components are that: the baffle plate is arranged and used for isolating the fluid, and the air passing portion is arranged and used for converging the fluids entering two sides together; and the extension plate is arranged, so that the effect of converging the fluid onto the baffle plate is achieved, and the effect that fluid is dispersed and cannot be converged together is prevented.

Preferably, the heating assembly includes a heating base and a heating member disposed in the heating base.

The effects achieved by the above components are that: the heating member is arranged and used for heating the fluid, and the heating base is arranged and used for fixing the heating member.

Preferably, a suction port connecting base is disposed outside the heating assembly; a telescopic pipe is arranged outside the suction port connecting base; and a suction nozzle is detachably connected to an end, away from the suction port connecting base, of the telescopic pipe.

The effects achieved by the above components are that: the suction port connecting base is arranged and used for fixing the telescopic pipe; the telescopic pipe is arranged, which can be lengthened or shortened at will according to the requirements of the user, and after use, the telescopic pipe automatically retracts due to the principle of thermal expansion and cold contraction; and the suction nozzle is arranged, and the user performs air outlet work.

Preferably, a handle assembly is arranged at an upper end of the water blower main body; and the handle assembly includes a handle main body, a knob disposed on the handle main body and a button disposed on the handle main body.

The effects achieved by the above components are that: the handle assembly is arranged, which can perform lifting work on the water blower main body, so that the user can lift the water blower main body through the handle main body; and the knob and the button are arranged and used for performing opening and closing and gear switching on the water blower main body.

Preferably, the inner cover filter sponge is disposed on a periphery of the air inlet cover.

The effect achieved by the above components is that: the inner cover filter sponge is disposed on the periphery of the air inlet cover, so that the filtering effect is enhanced.

Preferably, a circuit board is arranged in the water blower main body, and the circuit board is electrically connected to the button, the knob, the motor, and the heating member.

The effects achieved by the above components are that: the circuit board is arranged and used for controlling the work of the water blower main body, and the circuit board is electrically connected to the button, the knob, the motor, and the heating member, so that the user can control the circuit board through the button and the knob, and then the motor and the heating member are driven to work.

Compared with the prior art, the present invention have the following advantages: through arrangement of the first air inlet flow channel and the second air inlet flow channel, air inlet is performed on the water blower main body, so that the air inlet amount of the water blower main body is increased; through the arrangement of the air duct partition plate, the fluid between the first air inlet flow channel and the second air inlet flow channel is prevented from blowing directly against each other so as to damage the component in the water blower main body, and the fluid can be converged into the accumulated air after passing through the air duct partition plate, so that the air outlet amount is increased; and the heating assembly is arranged and used for heating the fluid, so that the fluid is hot air when passing through the air outlet flow channel.

Figure 1:
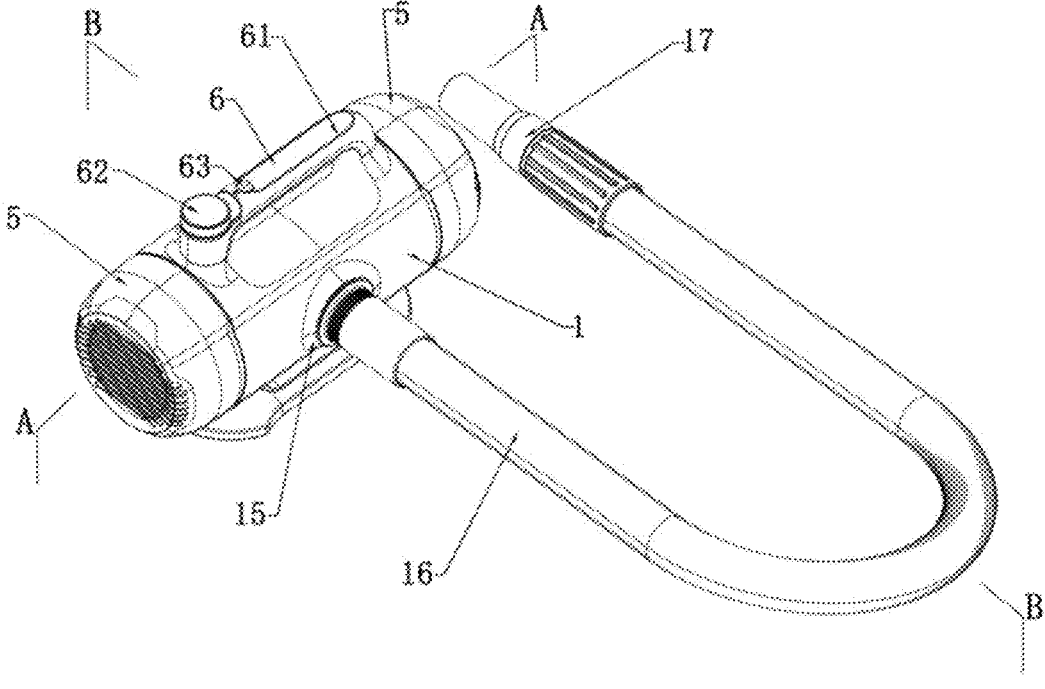
FIG. 1 is a schematic structural diagram of the present invention.

Reference numerals in the drawings: 1: water blower main body; 11: first air inlet flow channel 12: second air inlet flow channel; 13: air outlet flow channel; 14: air inlet assembly; 15: suction port connecting base; 16: telescopic pipe; 17: suction nozzle; 2: air duct partition plate; 21: baffle plate; 22: air passing portion; 23: extension plate; 3: heating assembly; 31: heating base; 32: heating member; 4: electric motor assembly; 41: motor; 42: air inlet cover; 43: magnetic attraction piece; 44: stator; 5: outer casing assembly; 51: air inlet outer cover; 52: sponge support; 53: pre-filter sponge; 54: air cover filter sponge; 55: inner cover filter sponge; 56: magnet; 6: handle assembly; 61: handle main body; 62: knob; 63: button; 7: circuit board.

DETAILED DESCRIPTION OF THE EMBODIMENTS

Embodiments of the present invention are disclosed below with reference to the drawings, and for clarity of description, many of the practical details will be described together in the following description. However, it should be understood that the practical details should not be used to limit the present invention. That is, in some embodiments of the present invention, the practical details are unnecessary. In addition, in order to simplify the drawings, some conventional structures and assemblies are shown in the drawings in a simple schematic manner.

It should be noted that, all directional indications (such as above, under, left, right, front, and rear) in the embodiments of the present invention are only intended for explaining a relative position relationship, a motion condition, etc., between components in a certain posture (as shown in the accompanying drawings), and if the posture changes, the directional indications change accordingly.

Furthermore, in addition to being used for representing orientations or positional relationships, some of the above terms may also be used to represent other meanings, for example, the term "above" may also be used to represent a certain attachment relationship or connection relationship in some cases. A person of ordinary skill in the art can understand specific meanings of these terms in the present invention based on specific situations.

In addition, the terms "mounted", "disposed", "provided", "connected", "attached", and "sleeved" should be understood in a broad sense. For example, it may be a fixed connection, a detachable connection, or an integral structure; it may be a mechanical connection or an electrical connection; it may be a direct attachment, or an indirect attachment through an intermediate medium, or a connection between two devices, elements, or components. The connection manner involved herein is the prior art, without any improvement, and belongs to the common knowledge of a person skilled in the art. A person of ordinary skill in the art can understand specific meanings of these terms in the present invention based on specific situations.

In addition, descriptions involving "first", "second", etc. in the present invention are only intended for descriptive purposes, but are not intended to specifically indicate an order or a sequential meaning, and are not intended to limit the present invention. They are only intended to distinguish the components or operations described by the same technical terms, and should not be construed as indicating or implying their relative importance or implying the number of technical features indicated. Therefore, defining a feature with "first" and "second" can explicitly or implicitly indicate that at least one of such feature is included. In addition, the technical solutions in the embodiments can be combined with each other, but only on the basis that they can be realized by a person of ordinary skill in the art. When the combination of the technical solutions is contradictory or cannot be implemented, it should be considered that the combination of the technical solutions does not exist, and does not fall within the scope of protection of the present invention.

Figure 2:
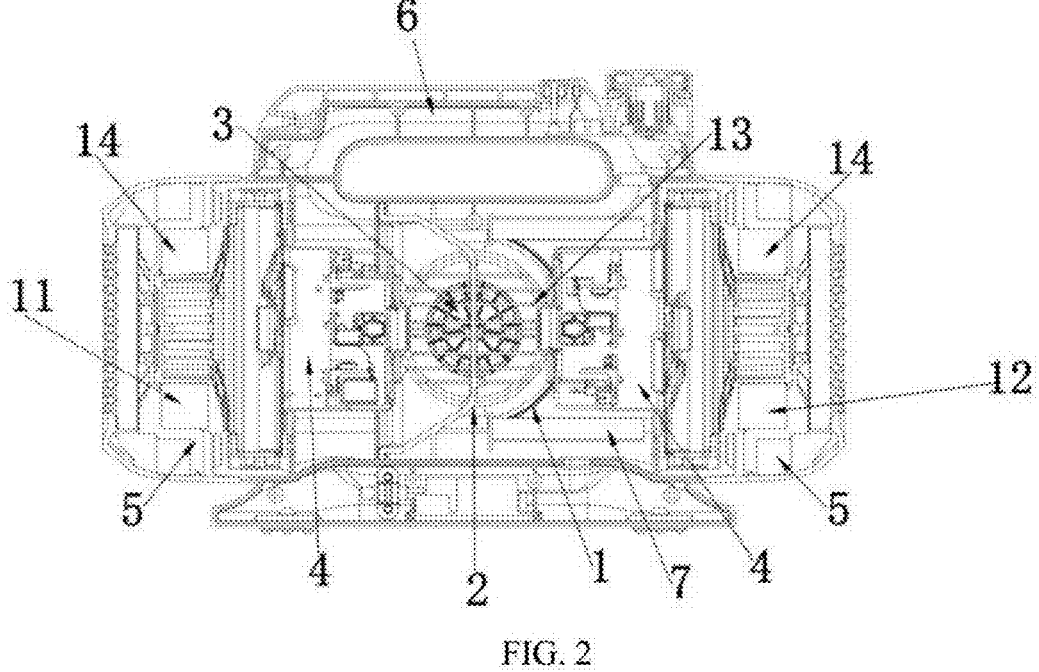
FIG. 2 is a sectional view taken along a section line A-A in FIG. 1 according to the present invention.
Figure 3:
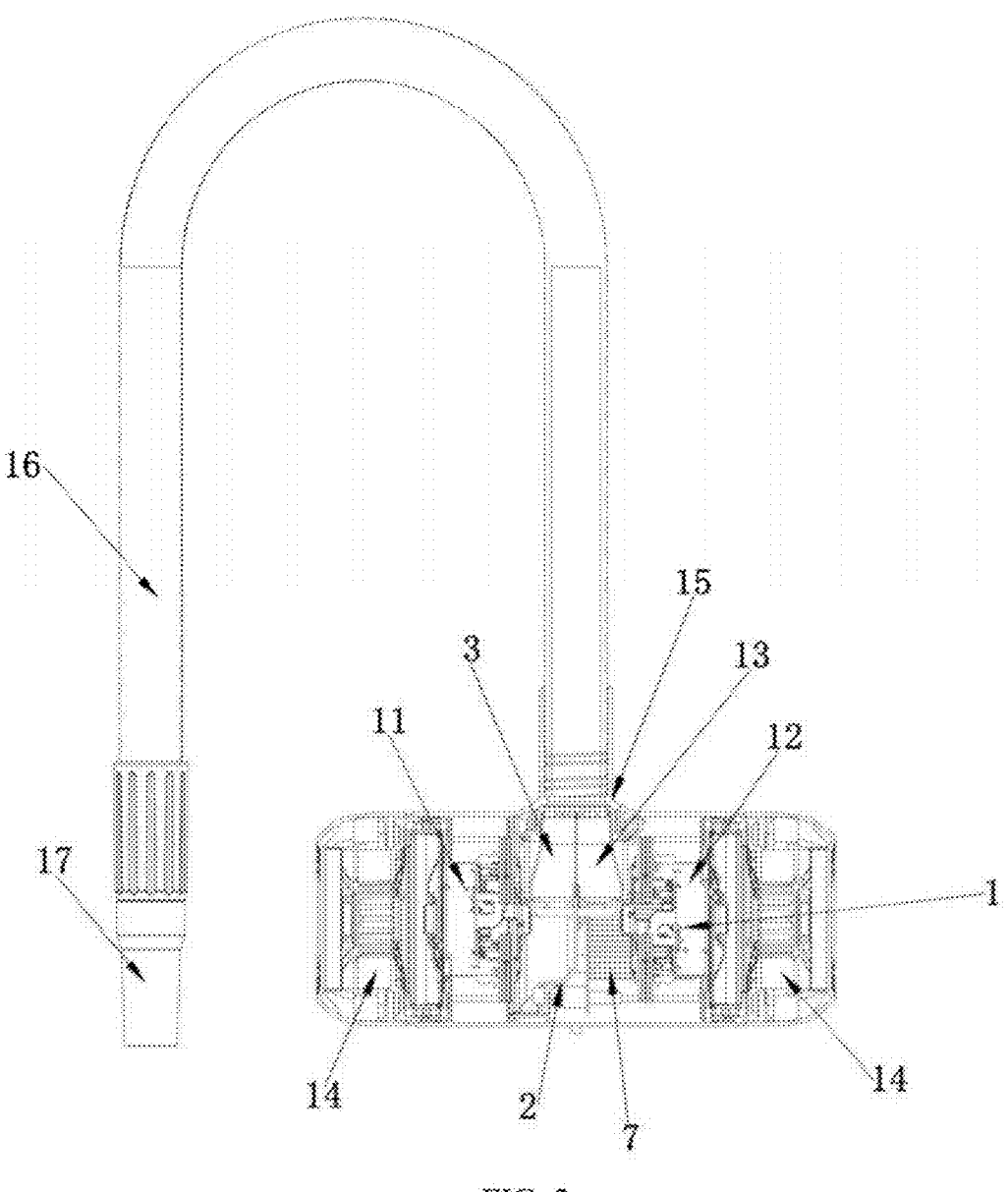
FIG. 3 is a sectional view taken along a section line B-B in FIG. 1 according to the present invention.
Figure 4:
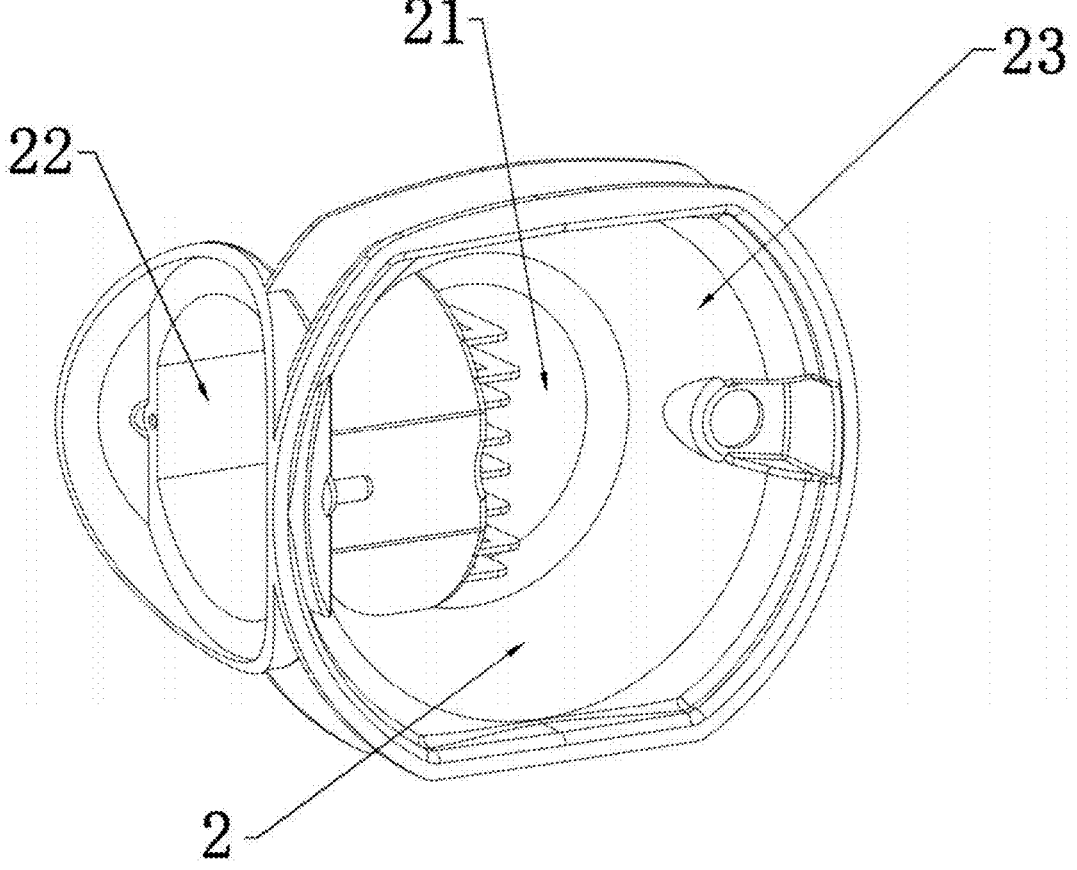
FIG. 4 is a schematic structural diagram of an air duct partition plate according to the present invention.
Figure 5:
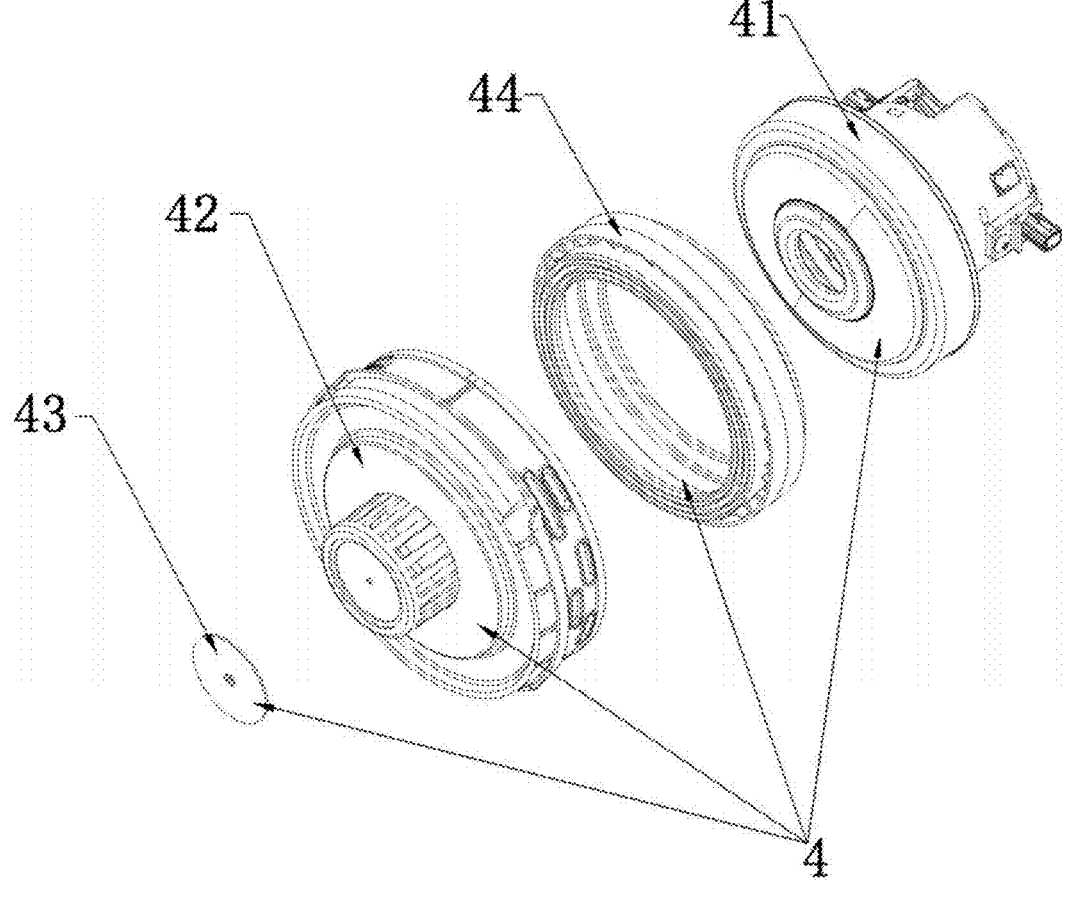
FIG. 5 is a structural exploded view of an electric motor assembly according to the present invention.
Figure 6:
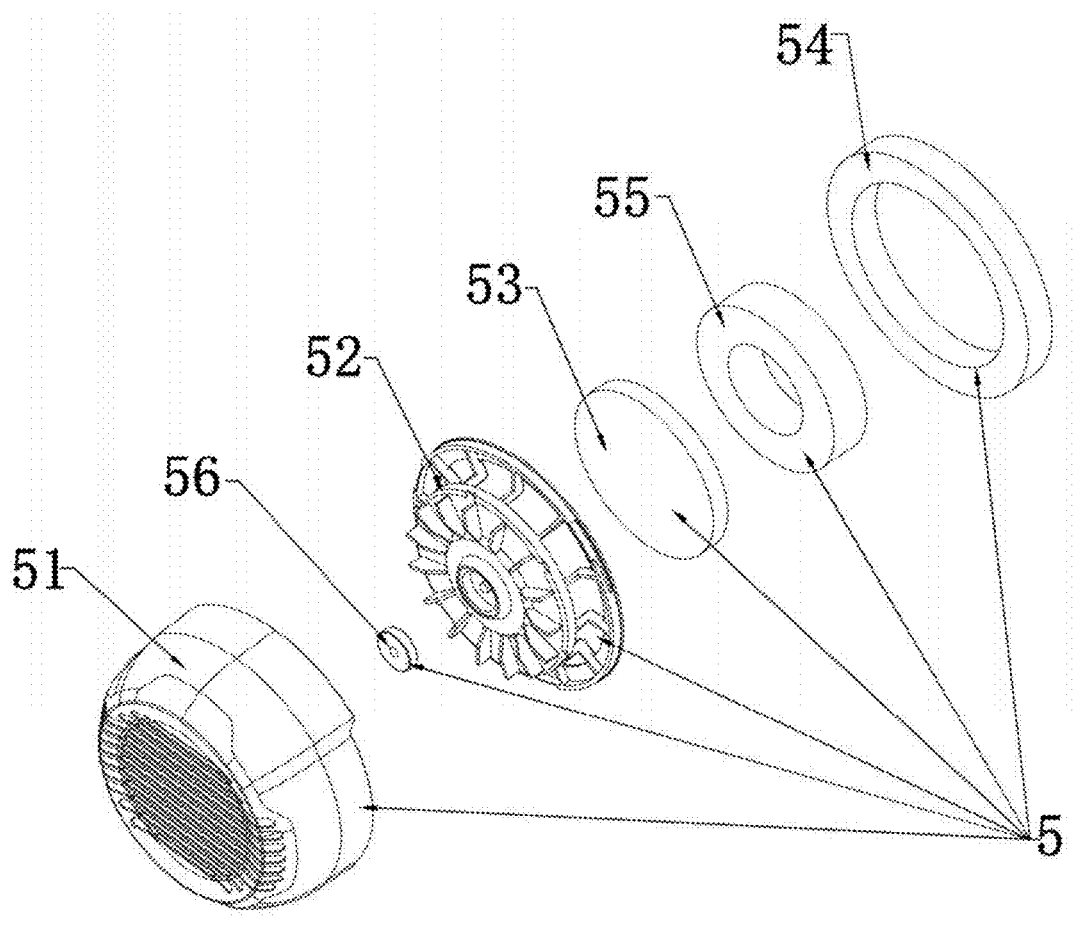
FIG. 6 is a structural exploded view of an outer casing assembly according to the present invention.
Figure 7:
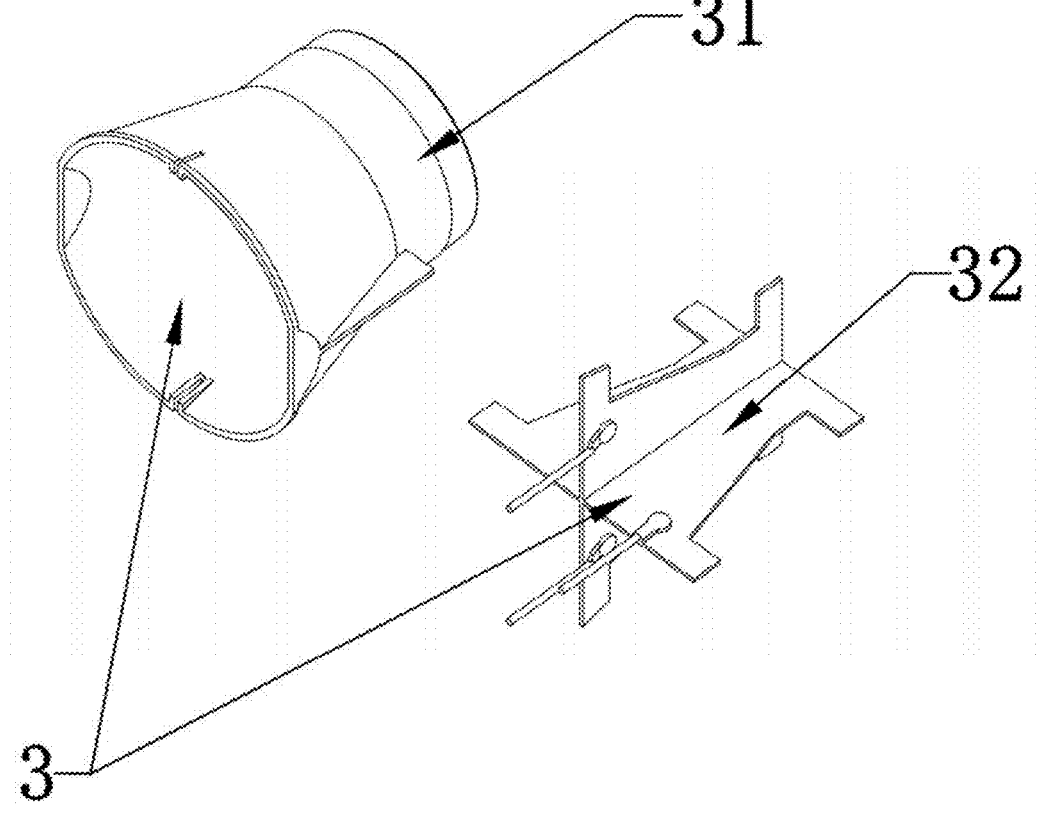
FIG. 7 is a structural exploded view of a heating assembly according to the present invention.

As shown in FIG. 1 to FIG. 7, the present invention provides a double-air-duct water blower for a pet, including a water blower main body (1), where a first air inlet flow channel (11) and a second air inlet flow channel (12) are respectively arranged on two sides of the water blower main body (1); an air duct partition plate (2) enabling the flow channel to generate a flow direction change is arranged in a position, close to the first air inlet flow channel (11) or the second air inlet flow channel (12), in the water blower main body (1); an air outlet flow channel (13) is arranged on the water blower main body (1); a heating assembly (3) is arranged in the air outlet flow channel (13); and a fluid enters the water blower main body (1) through the first air inlet flow channel (11) and the second air inlet flow channel (12), and is converged into accumulated air after passing through the air duct partition plate (2), so that air force is increased when the fluid passes through the air outlet flow channel (13), and then the fluid is blown out from the air outlet flow channel (13) after passing through the heating assembly (3). Through the arrangement of the first air inlet flow channel (11) and the second air inlet flow channel (12), air inlet is performed on the water blower main body (1), so that the air inlet amount of the water blower main body (1) is increased; through the arrangement of the air duct partition plate (2), the fluid between the first air inlet flow channel (11) and the second air inlet flow channel (12) is prevented from blowing directly against each other, causing the component in the water blower main body (1) is damaged, and the fluid can be converged into the accumulated air after passing through the air duct partition plate (2), so that the air outlet amount is increased; and the heating assembly (3) is arranged and used for heating the fluid, so that the fluid is hot air when passing through the air outlet flow channel (13).

The first air inlet flow channel (11) and the second air inlet flow channel (12) are both provided with an air inlet assembly (14); and the air inlet assembly (14) includes an electric motor assembly (4) and an outer casing assembly (5) disposed on an outer side of the electric motor assembly (4). The air inlet assembly (14) is arranged and used for performing air inlet work; the electric motor assembly (4) is arranged and used for driving the fluid to enter the water blower main body (1) from the outside of the water blower main body (1); and the outer casing assembly (5) is arranged and used for isolating substances other than the fluid from entering the water blower main body (1).

The electric motor assembly (4) includes a motor (41) disposed in the water blower main body (1), a stator (44)

disposed on a periphery of the motor (41), and an air inlet cover (42) arranged on a periphery of the stator (44); the motor (41) is connected to the air inlet cover (42) through the stator (44); a magnetic attraction piece (43) is arranged at a front end of the air inlet cover (42); and the air inlet cover (42) is connected to the water blower main body (1). The motor (41) is arranged and used for performing air suction and transmitting the fluid to the air outlet flow channel (13); the stator (44) and the air inlet cover (42) are arranged and used for fixedly connecting the motor (41) to the air inlet cover (42); and the air inlet cover (42) is arranged and used for performing air inlet work.

The outer casing assembly (5) includes an air inlet outer cover (51) and a sponge support (52) disposed in the air inlet outer cover (51); a pre-filter sponge (53) is arranged at a front end of the sponge support (52), an air cover filter sponge (54) is arranged on a periphery of the sponge support (52), and an inner cover filter sponge (55) is arranged in the sponge support (52); a magnet (56) magnetically connected to the magnetic attraction piece (43) is arranged on a central position of the sponge support (52); and the electric motor assembly (4) and the outer casing assembly (5) are magnetically connected to the magnetic attraction piece (43) through the magnet (56). Through the arrangement of the air inlet outer cover (51), the effect of firstly isolating large-particle substances from entering the water blower main body (1) is achieved; through the arrangement of the sponge support (52), and the pre-filter sponge (53), the inner cover filter sponge (55) and the air cover filter sponge (54) arranged on the sponge support (52), a user can fix the sponge and small-particle substances are filtered into the water blower main body (1); and the magnet (56) is arranged and used for being magnetically connected to the magnetic attraction piece (43), so that the user can conveniently detach and replace the outer casing assembly (5) or clean same.

The air duct partition plate (2) includes a baffle plate (21) and an air passing portion (22); the air passing portion (22) is disposed at two sides of the baffle plate (21) by taking the baffle plate (21) as a center; and an extension plate (23) is arranged at a position, facing the motor (41), of the baffle plate (21). The baffle plate (21) is arranged and used for isolating the fluid, and the air passing portion (22) is arranged and used for converging the fluids entering two sides together; and the extension plate (23) is arranged, so that the effect of converging the fluid onto the baffle plate (21) is achieved, and the effect that fluid is dispersed and cannot be converged together is prevented.

The heating assembly (3) includes a heating base (31) and a heating member (32) disposed in the heating base (31). The heating member (32) is arranged and used for heating the fluid, and the heating base (31) is arranged and used for fixing the heating member (32); and one end of the heating base (31) abuts against one end of the air passing portion (22), so as to prevent the fluid from passing from other places.

A suction port connecting base (15) is disposed outside the heating assembly; a telescopic pipe (16) is arranged outside the suction port connecting base (15); and a suction nozzle (17) is detachably connected to an end, away from the suction port connecting base (15), of the telescopic pipe (16). The suction port connecting base (15) is arranged and used for fixing the telescopic pipe (16); the telescopic pipe (16) is arranged, which can be lengthened or shortened at will according to the requirements of the user, and after use, the telescopic pipe (16) automatically retracts due to the principle of thermal expansion and cold contraction; and the suction nozzle (17) is arranged, and the user performs air outlet work.

A handle assembly (6) is arranged at an upper end of the water blower main body (1); and the handle assembly (6) includes a handle main body (61), a knob (62) disposed on the handle main body (61) and a button (63) disposed on the handle main body (61). The handle assembly (6) is arranged, which can perform lifting work on the water blower main body (1), so that the user can lift the water blower main body through the handle main body (61); and the knob (62) and the button (63) are arranged and used for performing opening and closing and gear switching on the water blower main body (1).

The inner cover filter sponge (55) is disposed on a periphery of the air inlet cover (42). The inner cover filter sponge (55) is disposed on the periphery of the air inlet cover (42), so that the filtering effect is enhanced.

A circuit board (7) is arranged in the water blower main body (1), and the circuit board (7) is electrically connected to the button (63), the knob (62), the motor (41), and the heating member (32). The circuit board (7) is arranged and used for controlling the work of the water blower main body (1), and the circuit board (7) is electrically connected to the button (63), the knob (62), the motor (41), and the heating member (32), so that the user can control the circuit board (7) through the button (63) and the knob (62), and then the motor (41) and the heating member (32) are driven to work.

Specific Embodiment

When a user chooses to use the water blower main body (1) to perform water blowing, the button (63) needs to be pressed first for starting, then the circuit board (7) transmits a signal to the motor (41) and the heating member (32) to work, and then the user can adjust the water blower main body to an appropriate gear through the knob (62). The fluid flows into the air duct partition plate (2) through the electric motor assembly (4) after being filtered by the outer casing assembly (5). Because the extension plate (23) is arranged, the fluid flows out of the air passing portion (22) through the baffle plate (21), and then the fluid flows out of the telescopic pipe (16) and the suction nozzle (17) to perform water blowing after being heated by the heating member (32); and after using by the user, the button (63) is pressed to close the water blower body (1).

The control of the circuit board (7) in the present invention is a conventional technical means and purpose of a person skilled in the art, and therefore, details are not described herein.

In the description of this specification, descriptions with reference to the term such as "an embodiment", "some embodiments", "example", "specific example", or "some examples" mean that specific features, structures, materials, or characteristics described with reference to the embodiment or example are included in at least one embodiment or example of the present invention. In this specification, illustrative expressions of these terms do not necessarily refer to the same embodiment or example. Moreover, the specific feature, structure, material, or characteristic described may be combined in any suitable manner in any one or more embodiments or examples. In addition, without mutual contradiction, those skilled in the art may incorporate and combine different embodiments or examples and features of the different embodiments or examples described in this specification.

All the standard parts used in the present invention can be purchased from the market, the special-shaped members can be customized according to the disclosure of the specification and the drawings. The specific connection manner of each part is a mature conventional means in the prior art, such as bolts, rivets, welding, pasting and the like, and details are not detailed here.

The foregoing descriptions are only preferred embodiments of the present invention, and a person of ordinary skill in the art can make various modifications and variations to the specific implementations and the application scope according to the idea of the present invention. The content of this specification shall not be construed as a limit to this application, and any modification, equivalent replacement, or improvement made without departing from the spirit and principle of the present invention shall fall within the scope of the claims of the present invention.

What is claimed is:

1. A double-air-duct water blower for a pet, comprising a water blower main body, wherein a first air inlet flow channel and a second air inlet flow channel are respectively arranged on two sides of the water blower main body; an air duct partition plate enabling the first air inlet flow channel and the second air inlet flow channel to generate a flow direction change is arranged in a position, close to the first air inlet flow channel or the second air inlet flow channel, in the water blower main body; an air outlet flow channel is arranged on the water blower main body; a heating assembly is arranged in the air outlet flow channel; and a fluid enters the water blower main body through the first air inlet flow channel and the second air inlet flow channel, and is converged into accumulated air after passing through the air duct partition plate, so that air force is increased when the fluid passes through the air outlet flow channel, and then the fluid is blown out from the air outlet flow channel after passing through the heating assembly.

2. The double-air-duct water blower for a pet according to claim 1, wherein the first air inlet flow channel and the second air inlet flow channel are both provided with an air inlet assembly; and the air inlet assembly comprises an electric motor assembly and an outer casing assembly disposed on an outer side of the electric motor assembly.

3. The double-air-duct water blower for a pet according to claim 2, wherein the electric motor assembly comprises a motor disposed in the water blower main body, a stator disposed on a periphery of the motor, and an air inlet cover arranged on a periphery of the stator; a magnetic attraction piece is arranged at a front end of the air inlet cover; and the air inlet cover is connected to the water blower main body.

4. The double-air-duct water blower for a pet according to claim 3, wherein the outer casing assembly comprises an air inlet outer cover and a sponge support disposed in the air inlet outer cover; a pre-filter sponge is arranged at a front end of the sponge support, an air cover filter sponge is arranged on a periphery of the sponge support, and an inner cover filter sponge is arranged in the sponge support; a magnet magnetically connected to the magnetic attraction piece is arranged on a central position of the sponge support; and the electric motor assembly and the outer casing assembly are magnetically connected to the magnetic attraction piece through the magnet.

5. The double-air-duct water blower for a pet according to claim 4, wherein the inner cover filter sponge is disposed on a periphery of the air inlet cover.

6. The double-air-duct water blower for a pet according to claim 3, wherein the air duct partition plate comprises a baffle plate and an air passing portion; the air passing portion is disposed at two sides of the baffle plate by taking the baffle plate as a center; and an extension plate is arranged at a position, facing the motor of the electric motor assembly, of the baffle plate.

7. The double-air-duct water blower for a pet according to claim 1, wherein the heating assembly comprises a heating base and a heating member disposed in the heating base.

8. The double-air-duct water blower for a pet according to claim 7, wherein a suction port connecting base is disposed outside the heating assembly; a telescopic pipe is arranged outside the suction port connecting base; and a suction nozzle is detachably connected to an end, away from the suction port connecting base, of the telescopic pipe.

9. The double-air-duct water blower for a pet according to claim 1, wherein a handle assembly is arranged at an upper end of the water blower main body; and the handle assembly comprises a handle main body, a knob disposed on the handle main body and a button disposed on the handle main body.

10. The double-air-duct water blower for a pet according to claim 1, wherein the heating assembly comprises a heating member;

Wherein the double-air-duct water blower for a pet further comprises an electric motor assembly having a motor and a handle assembly having a knob and a button; and wherein a circuit board is arranged in the water blower main body, and the circuit board is electrically connected to the button, the knob, the motor, and the heating member.

\* \* \* \* \*